May 11, 1937.    A. MAURER    2,080,145
VARIABLE SPEED DRIVE
Filed Feb. 29, 1936    2 Sheets-Sheet 1

Inventor
Albrecht Maurer
by Parker + Carter
Attorneys.

May 11, 1937.  A. MAURER  2,080,145
VARIABLE SPEED DRIVE
Filed Feb. 29, 1936  2 Sheets-Sheet 2
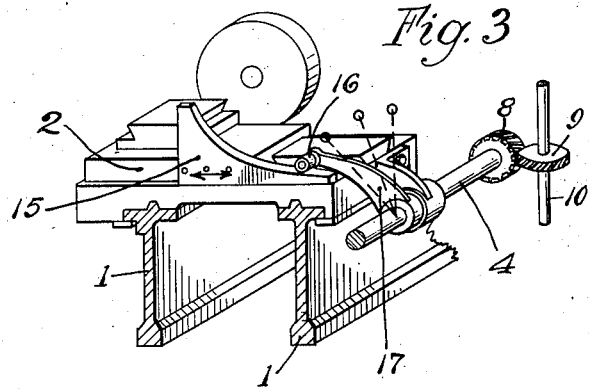
Fig. 3
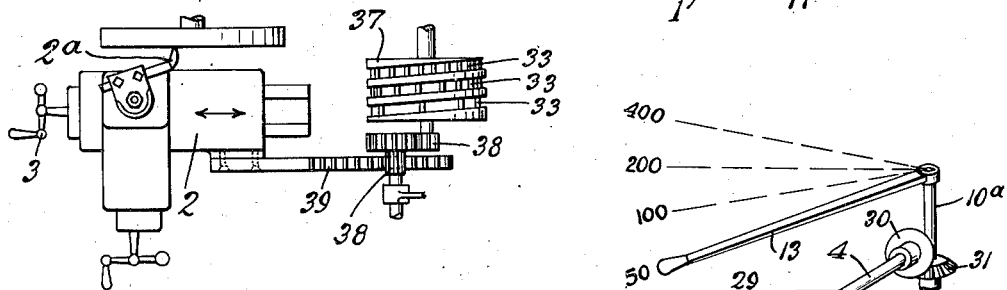
Fig. 6
Fig. 4
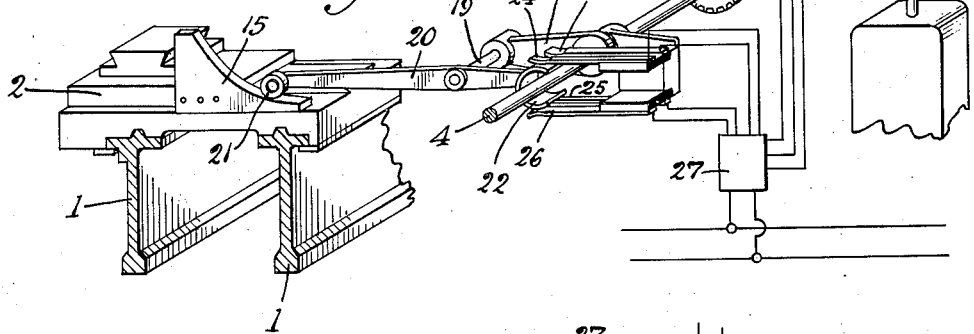
Fig. 5
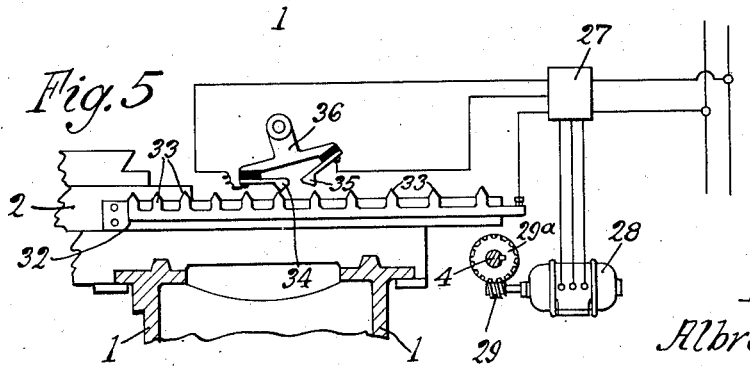
Inventor
Albrecht Maurer
by Parker & Carter.
Attorneys.

Patented May 11, 1937

2,080,145

UNITED STATES PATENT OFFICE 2,080,145

VARIABLE SPEED DRIVE

Albrecht Maurer, Bad Homburg vor der Hohe, Germany, assignor to Link-Belt Company, Chicago, Ill., a corporation of Illinois Application February 29, 1936, Serial No. 66,345
In Germany March 1, 1935

17 Claims. (Cl. 82—21)

This invention relates to speed controls for lathes and other generally analogous cutting, shaping, surfacing and finishing tools and machines.

It has for one object to provide automatic means for maintaining a constant cutting speed. Another object is to provide in connection with devices of the general type indicated automatic means for maintaining constant cutting speed which is automatically varied in response to the changing or variable diameter of the piece which is being cut, surfaced, finished or otherwise worked upon. Another object is to provide such a control which may be readily combined or used with a main drive, embodying stepless or substantially stepless driving means.

The problem is complicated where the lathe or similar machine may be used at many different cutting speeds. Thus, if only one initial cutting speed is to be used, the problem of maintaining a constant cutting speed as the diameter of the work changes is relatively simple. While, if the lathe may be used at a variety of initial cutting speeds, the problem of providing an automatic speed control, which will maintain a constant cutting speed, irrespective of the original cutting speed for which the machine is set for a particular operation, or on a particular piece of work, is greatly complicated. It is, therefore, one of the objects of the present invention to provide not only an automatic means for maintaining a constant cutting speed, but to provide such a means suitable for effective use with a machine which may be operated or may be set to operate for a wide variety of initial cutting speeds.

Other objects will appear from time to time in the specification and claims.

The invention is illustrated more or less diagrammatically in the acompanying drawings, wherein:—

Figure 3 is a diagrammatic view in perspective, with parts in section and parts omitted, showing a modified form of the device;

Figure 4 is a view somewhat similar to Figure 3, showing diagrammatically in perspective a further modification of the control;

Figure 5 is a diagram with parts in section and parts omitted, illustrating a further modification;

Figure 6 is a plan view with parts omitted, illustrating a further modification.

The invention as illustrated herewith is applied to a lathe, conventionally shown. It might, however, be applied to any sort of mechanism which is used for turning, cutting, finishing or surfacing a piece of work. In general the lathe comprises means for holding and for rotating the work and for holding and moving a tool, the tool being arranged on a carriage which is moved toward the center of rotation as the cutting and surfacing progresses, the cutting or surfacing commencing upon the work at a given distance from the center of rotation and the tool being moved as the work continues successively to points at a different distance from the center of rotation until the work is completed.

Figure 1:
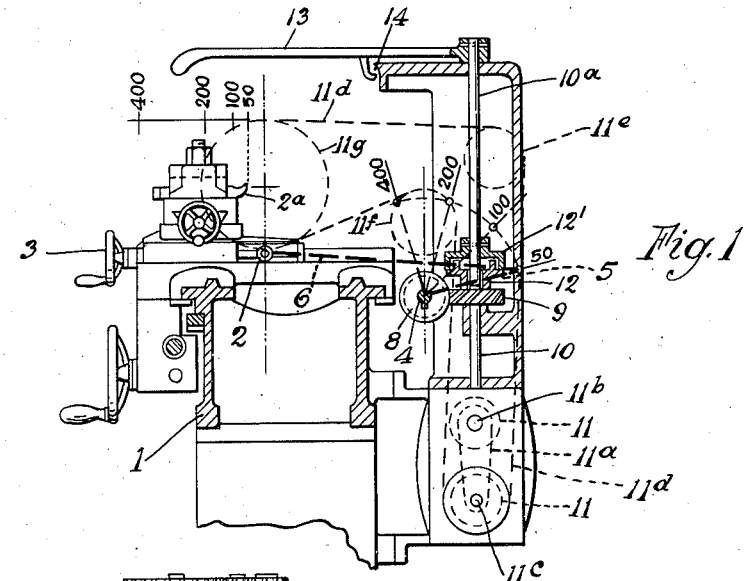
Figure 1 is a vertical section with parts in elevation and parts in section and parts broken away, taken at line 1—1 of Figure 2.
Figure 2:
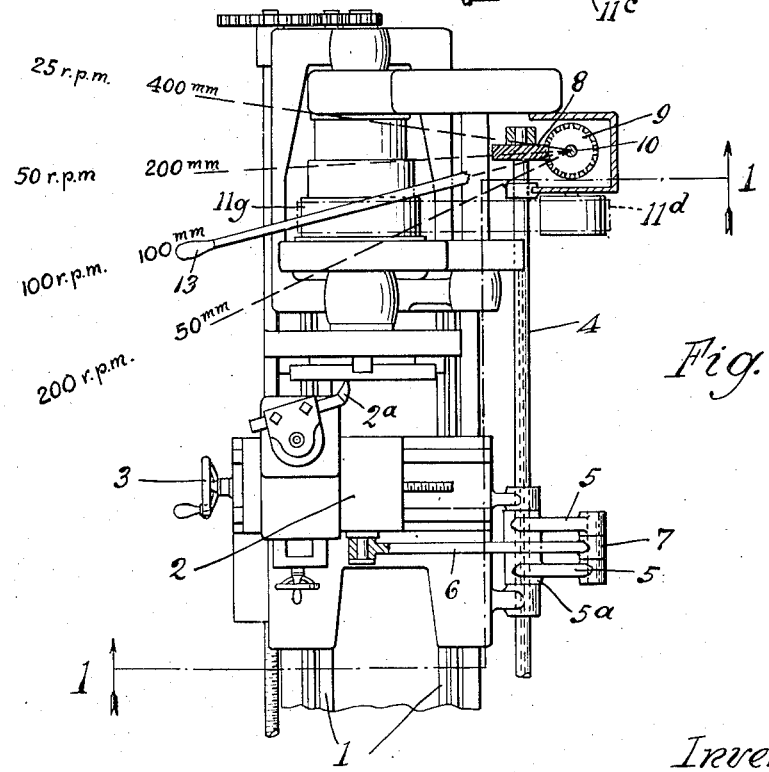
Figure 2 is a plan view to which the lathe and the control have been applied.

As shown in Figures 1 and 2, 1 is a lathe, 2 is a cross slide member arranged to carry a tool 2a in a suitable tool carrier. The slide moves in guides of any desired sort and is adjusted as to position by a hand wheel 3. Any suitable tail stock may be provided for supporting the work at one end. None is shown here as the details of the lathe in this respect form no essential part of the present invention. Likewise any suitable head stock may be provided. The details of this are not described herewith because they form no essential part of the present invention. It is sufficient to say that the invention is applied to a lathe having means for holding the work and for rotating it.

Mounted in suitable bearings along one side of the lathe as an intermediate control member is a shaft 4 which is mounted in a generally horizontal position and in alignment with some part of the lathe, preferably the bed. Double levers 5 may be mounted upon a hub member 5a which is slidable longitudinally of the shaft 4 and is prevented from turning with respect to the shaft by being splined upon it or otherwise secured to it, for example, by a groove and a spline. A link 6 is pivoted between the double levers 5, at one end as at 7 and at its opposite end is pivoted to the cross slide 2. Displacement of the cross slide 2 in response to movement of the adjusting wheel 3 acts through the link 6 and the levers 5 to turn the intermediate control shaft 4. The levers 5 and the link 6 are proportioned with respect to the cross slide 2, which is moved to vary the diameter of the work, so that the control shaft 4 is given a turning movement corresponding to the logarithm of the cross slide movement or displacement. The positions indicated numerically on Figure 1 are those suitable for a cutting speed of 31.4 metres per minute. Thus the positions to the right, reading counter-clockwise from 50 to 400, are the positions occupied by the connecting joint 7, where the levers 5 and the link 6 are joined, and the positions indicated at the upper left of Figure 1 from 50 to 400 are the corresponding positions occupied by the cross slide. It will be noticed that in Figure 1 the levers 5 and the link 6 are shown by dash lines only to simplify the showing of the parts and to avoid obscuring other parts shown in the figure.

In order to vary the speed with which the work piece is driven, the intermediate control shaft 4 must be connected to the drive control. This is accomplished by the gear 8 which is mounted on the shaft 4 and which meshes with a corresponding gear 9 which latter is fixed on the adjusting shaft 10 of a speed regulating device. In the form shown in Figures 1 and 2 this speed regulating device is associated with an adjustable stepless drive so as to change the adjustment of that drive and thereby to vary the speed of rotation of parts driven from it.

The drive as illustrated diagrammatically in Figure 1 may be similar to that shown in my co-pending application Serial Number 628,158, filed August 10, 1932, and comprises two pairs of conical pulleys 11, each pair arranged so that the pulleys can be moved toward and from each other, the pulleys of one pair being moved toward each other as the pulleys of the other pair are moved apart. A belt or chain 11a engages the pulleys of both pairs. It will be understood that instead of the stepless gear comprising the pulleys just described, an electric motor of variable speed or other variable speed control gear might be used. In fact any such variable speed drive may be used provided the control of this is such that movement of the regulating device or adjusting shaft 10 brings about a logarithmic change of the driven R. P. M.

Whatever the exact form of the drive, whether it be a stepless gear shown, or an electric motor or some other drive, the turning movements of the intermediate control shaft 4, which are caused by movements of the cross slide 2, cause a rotation of the adjusting shaft 10 and through this movement cause a variation in the speed of drive so that the cutting speed remains the same throughout, irrespective of change of the work diameter. The shapes and proportions of the gears 8 and 9 are such that the movements of the control shaft 4 bring about equal movements of the adjusting shaft 10 and consequently bring about equivalent movements of the stepless adjustable drive 11.

In Figure 1, 11b is the shaft which is driven by a motor or other suitable power source. This motor is not shown in the drawings. 11c is the second shaft of the stepless drive which is driven by the belt or chain 11a and it acts to drive the belt or chain 11d. The belt 11d works over an idler 11e and a second idler 11f to drive the pulley 11g on the cone pulley. The remainder of the drive is typical of well known lathes and need not be described in detail. Suitable gearing is provided in the lathe drive proper for rotating the head stock or face plate, and consequently for rotating the work.

In order to adjust manually the basic or starting R. P. M., independent of the connection of the intermediate control shaft 4, there is inserted between the gear 9 and the adjusting shaft 10 a friction coupling 12 which may be of any suitable design and which transmits the turning movement of the shaft 4 without slipping to the adjusting shaft 10. The driven part 12' of the friction coupling 12 is coupled through the shaft 10a with a hand control lever 13 by means of which the gear can be adjusted, the hand lever 13 being effective to overcome the friction in the friction coupling 12 so that when the hand control lever 13 is operated, the intermediate control shaft 4 remains at rest, being held in place by the connection through the levers 5 and the link 6 to the cross slide 2.

It is to be understood that in place of the friction coupling 12, 12', any other disengageable connection between the intermediate control shaft 4 and the adjusting spindle 10 of the gear, which would permit suitable relative adjustment of the parts, may be used. A suitable indicator, by means of which the adjusted cutting speed can be indicated and read, may be used in connection with the manual control lever 13. Such a device is illustrated in my co-pending application Serial No. 628,158.

While the device of the present invention might be designed for a considerable range of diameters to maintain the constant cutting speed required, the particular form shown herewith is designed for diameters from 50 to 400 mm. and will maintain accurately a constant cutting speed throughout this range.

On Figure 2 the control lever 13 is in part broken away, but its several positions are, however, indicated on the figure. A number of positions of the control lever 13 are indicated and for each position there is shown on the drawing the diameter figures and the corresponding R. P. M. for a constant cutting speed of 31.4 metres per minute. Another cutting speed might be selected and the positions and rotations and diameters would be different but those indicated serve as a particular example.

The lever 13 is provided with a reading index 14 by means of which, in accordance with the invention set out, in my co-pending application 628,158, it is possible to read off any desired set of values of corresponding cutting speed and work diameter.

In the modified form of Figure 3, instead of using the levers 5 and the link 6 to cause the desired rotation in the intermediate control shaft 4, a cam arrangement is shown. The cross slide 2 has attached to it a cam member 15 which is provided with a suitably designed curved face as shown. In contact with the curved face, to run along it, is a roller 16 carried by a lever 17. This lever is attached to the intermediate control shaft by being splined to it or being attached by a spline and groove or otherwise, so that it may slide along the shaft but may not rotate with respect to it. As shown, the weight of the roller 16 and the lever 17 is sufficient to hold the roller constantly in contact with the face of the cam. A counterweight might be added or spring means might be provided for accomplishing this, but ordinarily the weight of the parts themselves is sufficient. The shape of the cam is such that the movement which is given to the intermediate control shaft 4 corresponds to the logarithms of the movement of the cross slide 2. The movement of the shaft 4 is effective through the gears 8 and 9 upon the shaft 10 in the manner shown in and described in connection with the form of the device shown in Figures 1 and 2.

For some purposes it is desirable to provide an additional drive for the intermediate control shaft 4. In the forms of the device thus far described the shaft 4 is positively rotated from the cross slide. It may be desirable to relieve the cross slide of the load of this drive and to use the cross slide in its movement merely as a control, but to provide an additional positive driving means for rotating the intermediate control shaft 4 in response to movement of the cross slide. An arrangement for accomplishing this result is shown diagrammatically in Figure 4 in which a motor is provided for driving the shaft 4. Mounted upon the shaft 4 and keyed to it is a lever 18 which carries at one end a pin 19 positioned generally parallel to the shaft 4 and serving as a pivotal support for a second lever 20. This lever is provided at one end with a roller 21, which rests upon the face of the cam 15 which latter is attached to and moves with the cross slide 2. The lever 20 is so supported that it is overbalanced on the end which carries the roller 21 and thus the weight of the parts alone holds the roller in contact with the cam face. At its opposite end the lever 20 carries a generally U-shaped contact member 22 which preferably surrounds the shaft 4.

The lever 18 carries two pairs of contacts 23, 24 and 25, 26, the contacts being insulated from each other. The contacts are connected by suitable wiring with a source of current and through a relay 27 are connected with an electric motor 28. The wiring is such that when one pair of contacts is actuated the motor will be driven in one direction and when the opposite pair of contacts is actuated it will be driven in the opposite direction. The motor carries a worm 29 which meshes with a worm gear 29a fixed on the shaft 4.

When the parts are in the position shown in Figure 4, the lever 20 is at or near its middle position and in that position it lies in a plane parallel to that of the lever 18 and the contact 22 is out of contact with the members 24 to 26, inclusive. If now the cross slide 2 is moved to carry the cam 15, the lever 20 is tilted and brings the contact 22 into contact with one pair of contacts, thus closing the gap either between the contacts of the pair 23, 24 or that between the pair 25, 26, and whichever pair of contacts is contacted and whichever circuit is closed, the electric motor 28 is placed in operation by the relay 27 and so the motor rotates in one direction or the other and moves the shaft 4 until the lever 18 again lies in a plane parallel to the lever 20 and thus again moves the contact 22 into the non-contact position, breaks the circuit and stops the motor.

The rotation of the shaft 4 in the form shown in Figure 4 is transmitted through the gears 30, 31 to the device for controlling the speed of rotation. It is indicated diagrammatically as including the shaft 10 which has been shown and described in greater detail in connection with the form of the device shown in Figure 1. It is to be understood that the same drive for the lathe shown in Figure 1 may be used in the form of the device shown in Figure 4. In this latter form of the device the control lever 13 for the independent manual adjustment is the same as that shown and described earlier.

As shown in Figure 5 a still further means is provided for varying the position of the shaft 4 by means of a positive electric drive associated with a control which is actuated by movement of the cross slide, embodying a cam mechanism. In the form shown in Figure 5 the cam mechanism is no longer used but a contact bar 32 is attached to or associated with the cross slide. There are arranged upon the contact bar certain contacts 33. It will be noticed that in the form shown they are spaced from each other at varying distances and each corresponds to a fixed work diameter ratio and the transition or movement from one contact to the next corresponds to a proportional change in the work diameter. Contacts 34 and 35 are provided on a swinging support 36. The contacts are connected by suitable wiring to a relay 27 which is also in circuit with the several contacts 33. The contact carrying member 36 moves or swings in accordance with the direction of movement of the contact bar 32. As shown in Figure 5 it has been swung to the right in response to movement of the bar 32 to the right. In this position the contacts 33 of the bar come successively into contact with the contact member 34. Upon motion to the left the member 36 is swung from the position shown and thus the contact 35 comes into operation, while the contact 34 is swung up out of operation and in movement to the left, therefore, the contact 35 co-operates with the contacts 33 successively throughout the continuing movement to the left of the bar 32.

When one of the contacts 33 makes contact with one or another of the contacts 34 or 35, the circuit for the electric motor 28 is closed through the relay 27 and the motor commences to run. The motor is designed so that it automatically stops after a predetermined amount of movement, for example, after one or more revolutions. Obviously some automatic motor control may be associated with the motor to cause it automatically to stop after a predetermined amount of rotation. By means of the arrangement of Figure 5, a new contact 33 is brought into cooperation with one or another of the contacts 34 or 35 whenever the turning diameter of the work piece has changed to a degree sufficient to necessitate a change in the speed of rotation of the drive. The contacts may be so spaced that they automatically effect this re-adjustment whenever a change in diameter of, say 10%, has occurred. Obviously the contacts can be arranged to act for a greater or a less proportional change in diameter.

The shaft 4 is rotated from the motor 28 in the form shown in Figure 5 by means of gears 29 and 29a in the same manner as shown in Figure 4, and this transmission, including the gears 29 and 29a, is so proportioned that upon each rotation or period of movement of the motor the shaft 4 is rotated to such an extent or through such a degree that the R. P. M. control device, including the shaft 10 and associated parts, is moved sufficiently to vary the R. P. M. in accordance with the change in diameter which has occurred.

The form of the device shown in Figure 6 is generally similar to that shown in Figure 5 except that the contacts 33, instead of being arranged upon a rack or bar, are mounted about a rotary member. As shown they are arranged in a helical line upon a drum or pulley 37. This pulley is rotated through gears 38 which engage a rack 39. This rack as shown is attached to the cross slide 2. This arrangement of the contacts about a drum or pulley permits a very finely stepped subdivision of the entire diameter range without bringing the individual contacts 33 too close to each other for convenient or effective association with the contact 34 or 35 on the member 36.

The mechanism of the invention has been described above in connection with the several forms shown and the various parts and their operation have been described. While the mechanism can be designed in accordance with a variety of mathematical calculations, the calculations set out below indicate one solution of the problem.

In accordance with the present invention the problem of providing and maintaining actual constant cutting speed is solved in the following manner: The radial displacements of the tool are converted into motions of an intermediate control member, the ratio of which is equal to the logarithms of the radial displacements and the parts are so related and proportioned that through the motion of an intermediate control member a control device is adjusted to influence or control the R. P. M. Through the operations of this control device like movements of the adjusting device bring about changes in the R. P. M., the ratio of which is equal to that of the logarithms of the R. P. M. Thus it is possible to develop an arrangement by means of which the control device which controls or influences the R. P. M. can be separated from the intermediate control member and can be adjusted or controlled independently to give any desired basic R. P. M.

The device of the present invention embodies the following mathematical relations:

Between the work diameter $2r$, the R. P. M. $n$ and the cutting speed $v$ there exists the relation:

$$2\pi rn = v$$

or $$rn = \frac{v}{2\pi}$$

For constant cutting speed $v = 2C$ there results $$rn = C$$

or in logarithms $$\log r + \log n = \log C$$

In accordance with the invention the changes in $r$ are transmitted into motions $y$ of the intermediate control member in accordance with the following formula:

$$y = c \log r + \log c_1$$

Furthermore in accordance with the invention a control device for the R. P. M. is presupposed in connection with which the motions $z$ of the adjusting device lead to changes of the R. P. M. $n$ in accordance with the formula $$z = -c \log n + \log c_2$$

If, in accordance with the invention the motions $y$ of the intermediate control member are used as adjusting motions $z$ for the R. P. M. regulating device, and if therefore there is entered $y = z$, there follows:

$$c \log r + \log c_1 = -c \log n + \log c_2$$

or $$\log r + \log n = \frac{\log c_2 - \log c_1}{c} = \log C$$

Therefore, the desired relation exists between $r$ and $n$.

The change of the basic adjustment of the R. P. M. regulating device corresponds to the change of $c_2$. It is therefore possible by changing the basic adjustment to obtain any desired values of $C$ and in this way adjust the device for all driven R. P. M. $n$ or, in other words, for any desired cutting speed $v$.

In the drawings there have been shown by way of example a number of possible embodiments of the invention and of the calculations above set out. It is to be understood, of course, that there are many other embodiments which fall within the invention and that the invention is not limited in its practical application or embodiment merely to those shown in the attached figures.

I claim:

1. In combination with a lathe or the like, having a variable speed drive, means for maintaining automatically a constant cutting speed irrespective of changes in the diameter of the work, said means comprising a tool holder, means for moving it radially with respect to the work, and control means associated with the drive of said lathe to control the speed thereof, and electrical means actuated by movement of said tool holder to affect said control means, said electrical means comprising a plurality of spaced contact point members, a contact part adapted to contact one of said point members, and means for moving said point members progressively past said contact part, whereby movement of the tool holder is effective upon said control means to vary the speed of the drive to produce constant cutting speed.

2. In combination with a lathe or the like, having a variable speed drive and manual means for setting it, means for automatically maintaining a constant cutting speed irrespective of changes in the diameter of the work, said means comprising a tool holder, means for moving it radially with respect to the work, and an auxiliary control means associated with the drive of said lathe to control the speed thereof, and an electric drive between said tool holder and said control means whereby movement of the tool holder is effective upon said control means to vary the speed of the drive to produce constant cutting speed.

3. In combination with a lathe or the like, having a movable tool holder, a work holder and means for driving the work holder to rotate the work, and a speed control for said driving means having manual setting means, an auxiliary automatic means associated with the tool holder for maintaining a constant cutting speed irrespective of the diameter of the work, said means comprising an intermediate speed control including a plurality of cams and associated with said tool holder to act in response to movements thereof to change the R. P. M. of the work holder drive.

4. In combination with a lathe or the like, having a movable tool holder, a work holder and means for driving the work holder to rotate the work, and a speed control for said driving means having manual setting means, an auxiliary automatic means associated with the tool holder for maintaining a constant cutting speed irrespective of the diameter of the work, said means comprising an intermediate speed control linked to said tool holder, for relative movement with respect thereto, the linkage being such that the ratio of movement of said intermediate control is equal to the logarithms of the radial displacements of said tool holder, the said intermediate speed control being adapted to act in response to movements thereof to change the R. P. M. of the work holder drive, the parts being so proportioned that the ratio of movements of the adjusting device to changes in the speed is equal to the logarithms of the R. P. M. of the work holding drive.

5. In combination with a lathe or the like, having a variable speed drive and manual means for setting it, means for automatically maintaining a constant cutting speed irrespective of changes in the diameter of the work, said means comprising a tool holder, means for moving it radially with respect to the work, and an auxiliary control means associated with the drive of said lathe to control the speed thereof, and a connection between said tool holder and said control means whereby movement of the tool holder is effective upon said control means to vary the speed of the drive to produce constant cutting speed, and a friction connection between said manual means and said auxiliary control, whereby manual setting of the variable speed drive may be accomplished irrespective of the position of the auxiliary control.

6. In combination with a lathe or the like, having a variable speed drive and manual means for setting it, means for automatically maintaining a constant cutting speed irrespective of changes in the diameter of the work, said means comprising a tool holder, means for moving it radially with respect to the work, and an auxiliary control means associated with the drive of said lathe to control the speed thereof, and an electric drive between said tool holder and said control means whereby movement of the tool holder is effective upon said control means to vary the speed of the drive to produce constant cutting speed, and a friction connection between said manual means and said auxiliary control, whereby manual setting of the variable speed drive may be accomplished irrespective of the position of the auxiliary control.

7. In combination with a lathe or the like, having a movable tool holder, a work holder and means for driving the work holder to rotate the work, and a speed control for said driving means having manual setting means, an auxiliary automatic means associated with the tool holder for maintaining a constant cutting speed irrespective of the diameter of the work, and a friction connection between said manual means and said auxiliary control, whereby manual setting of the variable speed drive may be accomplished irrespective of the position of the auxiliary control.

8. In combination with a lathe or the like, having a movable tool holder, a work holder and means for driving the work holder to rotate the work, and a speed control for said driving means having manual setting means, an auxiliary automatic means associated with the tool holder for maintaining a constant cutting speed irrespective of the diameter of the work, said auxiliary automatic means comprising an intermediate control shaft and parts associated therewith and effective to convert radial movement of the tool holder into rotation of said shaft.

9. In combination with a lathe or the like, having a movable tool holder, a work holder and means for driving the work holder to rotate the work, and a speed control for said driving means having manual setting means, an auxiliary automatic means associated with the tool holder for maintaining a constant cutting speed irrespective of the diameter of the work, said auxiliary automatic means comprising an intermediate control shaft and parts associated therewith and effective to convert radial movement of the tool holder into rotation of said shaft, said parts comprising a crank on said shaft and a link connecting said crank to said tool holder.

10. In combination with a lathe or the like, having a movable tool holder, a work holder and means for driving the work holder to rotate the work, and a speed control for said driving means having manual setting means, an auxiliary automatic means associated with the tool holder for maintaining a constant cutting speed irrespective of the diameter of the work, said auxiliary automatic means comprising an intermediate control shaft and parts associated therewith and effective to convert radial movement of the tool holder into rotation of said shaft, said parts comprising a cam movable in response to movement of said tool holder, and a cam follower in contact with said cam and carried by a lever joined to said auxiliary shaft to permit relative sliding movement of the lever and shaft and to prevent relative turning movement of the two.

11. In combination with a lathe or the like, having a movable tool holder, a work holder and means for driving the work holder to rotate the work, and a speed control for said driving means having manual setting means, an auxiliary automatic means associated with the tool holder for maintaining a constant cutting speed irrespective of the diameter of the work, said auxiliary automatic means comprising an intermediate control shaft and parts associated therewith, linked thereto and effective to convert radial movement of the tool holder into rotation of said shaft, the linkage being such that the ratio of movement of said intermediate control is equal to the logarithms of the radial displacements of said tool holder, the said parts comprising a cam movable in response to movement of said tool holder, and a cam follower in contact with said cam and carried by a lever joined to said auxiliary shaft to permit relative sliding movement of the lever and shaft and to prevent relative turning movement of the two, the path of the cam shaped to cause a turning movement of the shaft in response to radial movement of the cam in a ratio equal to the logarithms of the two movements.

12. In combination with a lathe or the like, having a movable tool holder, a work holder and means for driving the work holder to rotate the work, and a speed control for said driving means having manual setting means, an auxiliary automatic means associated with the tool holder for maintaining a constant cutting speed irrespective of the diameter of the work, said auxiliary means including an electric motor, an auxiliary shaft and electrical connections between said motor and said tool holder to cause movement of the tool holder to actuate the motor to rotate the shaft in response to movement of the tool holder to a degree proportional to that movement.

13. In combination with a lathe or the like, having a movable tool holder, a work holder and means for driving the work holder to rotate the work, and a speed control for said driving means having manual setting means, an auxiliary automatic means associated with the tool holder for maintaining a constant cutting speed irrespective of the diameter of the work, said auxiliary means including an electric motor, an auxiliary shaft and electrical connections between said motor and said tool holder to cause movement of the tool holder to actuate the motor to rotate the shaft in response to movement of the tool holder to a degree proportional to that movement, said electrical connection comprising a contact device moved in response to movement of said tool holder, and wiring connections arranged to cause the motor to rotate in one direction or the other in correspondence with the direction of movement of said tool holder.

14. In combination with a lathe or the like, having a movable tool holder, a work holder and means for driving the work holder to rotate the work, and a speed control for said driving means having manual setting means, an auxiliary automatic means associated with the tool holder for maintaining a constant cutting speed irrespective of the diameter of the work, said auxiliary means including an electric motor, an auxiliary shaft and electrical connections between said motor and said tool holder to cause movement of the tool holder to actuate the motor to rotate the shaft in response to movement of the tool holder to a degree proportional to that movement, said auxiliary shaft carrying fixed upon it a contact arm, a second arm carried thereby and mounted to be rotated by movement of the tool holder, relative rotation of the said second arm with respect to the said first arm effective to complete a contact to set the motor into operation.

15. In combination with a lathe or the like, having a movable tool holder, a work holder and means for driving the work holder to rotate the work, and a speed control for said driving means having manual setting means, an auxiliary automatic means associated with the tool holder for maintaining a constant cutting speed irrespective of the diameter of the work, said auxiliary means including an electric motor, an auxiliary shaft and electrical connections between said motor and said tool holder to cause movement of the tool holder to actuate the motor to rotate the shaft in response to movement of the tool holder to a degree proportional to that movement, said auxiliary shaft carrying fixed upon it a contact arm, a second arm carried thereby and mounted to be rotated by movement of the tool holder, relative rotation of the said second arm with respect to the said first arm effective to complete a contact to set the motor into operation, the turning of said motor being effective upon the completion of a predetermined amount of turning to break the said contact and thereby to stop rotation of the motor.

16. In combination with a lathe or the like, having a movable tool holder, a work holder and means for driving the work holder to rotate the work, and means for moving the tool holder to carry the tool, a speed control and an intermediate control, an assembly for maintaining uniform cutting speed irrespective of changes in the diameter of the work, said device characterized by the fact that radial displacements of the tool holder are converted into motions of said intermediate control member, the ratio of which is equal to the logarithms of the radial displacements and characterized further by the fact that by the motions of the intermediate control member an R. P. M. controlling device is adjusted so that similar movements of the R. P. M. control device effect changes in the R. P. M. in accordance with a ratio which is equal to the logarithms of the R. P. M.

17. In combination with a lathe or the like, having a movable tool holder, a work holder and means for driving the work holder to rotate the work, and a speed control for said driving means having manual setting means, an auxiliary automatic means associated with the tool holder and comprising a plurality of cams for maintaining a constant cutting speed irrespective of the diameter of the work.

ALBRECHT MAURER.